United States Patent Office 2,945,725
Patented July 19, 1960

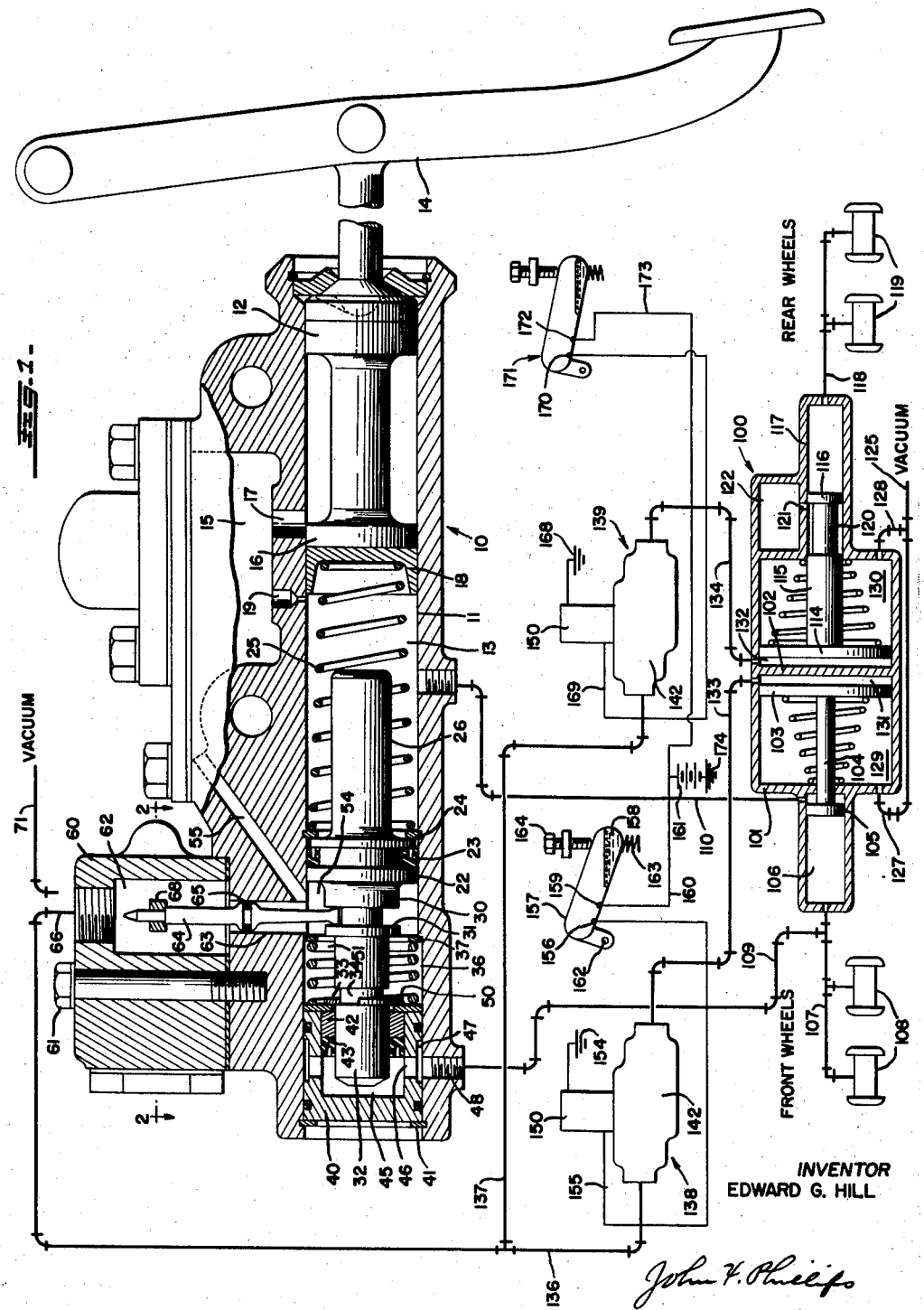

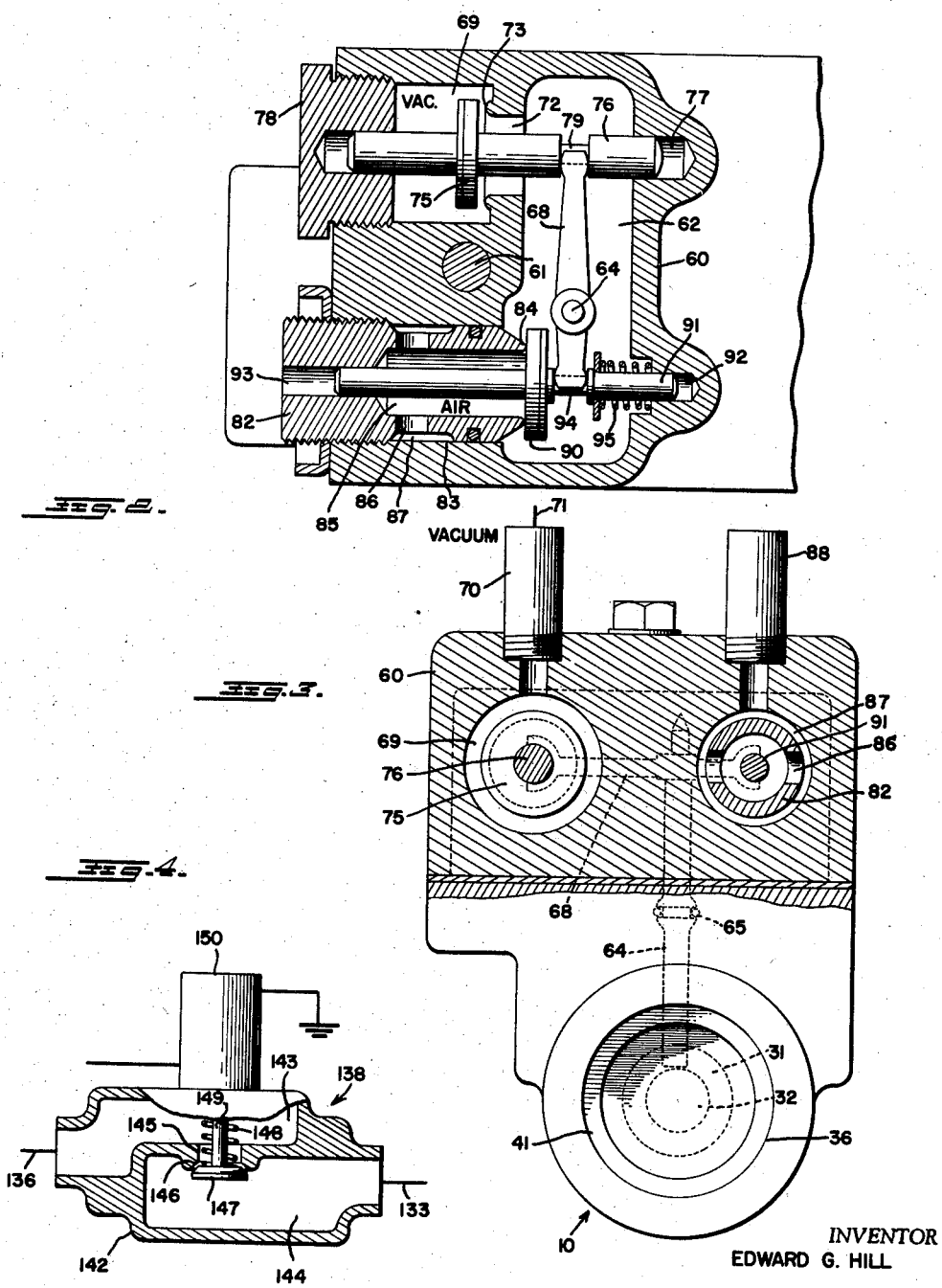

2,945,725

BOOSTER BRAKE SYSTEM

Edward Govan Hill, Birmingham, Mich., assignor to Kelsey-Hayes Company, Detroit, Mich., a corporation of Delaware Filed Jan. 31, 1957, Ser. No. 637,502

12 Claims. (Cl. 303—24)

This invention relates to a booster brake system for motor vehicles.

In my copending application Serial No. 523,309, filed July 20, 1955, now abandoned, I have disclosed and claimed a highly efficient booster brake mechanism for motor vehicles, and particularly for passenger vehicles. Such system involves the use of a dual motor unit each having a fluid pressure responsive member. One of such members displaces fluid from a pressure chamber into the rear wheel cylinders and forms the sole force for applying such pressure. The pressure responsive member of the other motor similarly displaces fluid from a pressure chamber to the front wheel brake cylinders, assisted by pressures generated in a pedal operable master cylinder. The brake applying pressures to the front wheels of a passenger vehicle, accordingly, are the sums of the pressures generated by the associated motor unit and by the pedal pressure applied by the operator, thus providing a higher maximum braking at the front wheels than at the rear wheels, which is highly desirable in a passenger vehicle because of the relatively heavy weight supported by the front wheels of the vehicle.

The application of rear wheel braking pressure solely by the associated booster motor unit is advantageous. This is true for the reason that excessive rear wheel braking pressures frequently will lock the rear wheels, causing them to lose traction and slide and thus materially reduce the decelerating effect of the brake system. In the copending application referred to I have disclosed inertia operated means responsive to a given rate of vehicle deceleration for cutting off the admission of fluid pressure to the motor unit for the rear wheels, thus preventing maximum possible braking pressures at the rear wheels and consequently preventing the sliding of the rear wheels. The use of the inertia responsive means in the system referred to has provided a highly efficient braking system in which materially increased deceleration rates have been attained by preventing the rear wheels from sliding.

In the copending application of William Stelzer, Serial No. 626,736, filed December 6, 1956, now Patent No. 2,862,364 there is disclosed a booster brake mechanism for a motor vehicle wherein pedal generated pressures are used for operating the valve mechanism of a booster motor and for assisting such motor in generating brake cylinder pressures. This mechanism has been found to be highly efficient in a number of ways. For example, a fluid displaceable piston is arranged directly coaxial with the pedal operable master cylinder and exposed to pressure therein, and is directly coaxially subject to hydraulic reactions in proportion to the braking pressures generated. A novel means is employed for utilizing movement of the plunger which is displaced by master cylinder pressure for operating the valve mechanism which controls the motor, and such valve mechanism has been found to be extremely smooth and efficient in operation. A booster controlling mechanism very similar to that shown in the copending application of William Stelzer referred to is disclosed in the present application and forms per se no part of the present invention.

An important object of the present invention is to provide a novel booster brake system embodying all of the advantages of my copending application Serial No. 523,309, now abandoned, referred to above, and to combine therewith an inertia controlled mechanism for limiting the energization of the front wheel booster motor unit, cooperating with the inertia controlled means for the rear wheel booster motor unit to come into operation at a higher rate of vehicle deceleration to limit the application of braking forces to the front wheels of a passenger vehicle, thus preventing the sliding of the front vehicle wheels.

A further object is to provide such a system wherein a control valve mechanism is employed for simultaneously controlling fluid pressures normally to the same extent in both booster motor units and to connect between the valve mechanism and each motor unit a valve controlled by an inertia operated switch, specifically a mercury switch, and to provide a greater degree of inclination of the inertia switch associated with the front wheel booster motor unit than that associated with the rear wheel booster motor unit so that the latter inertia switch operates at a lower rate of vehicle deceleration than the corresponding switch associated with the motor unit for the front wheels, thus permitting a higher degree of brake application to the front wheels even after the generation of braking forces to the rear wheels has been limited, and to then limit energization of the front wheel booster unit without affecting pedal generated pressures which may be applied by the operator.

Other objects and advantages of the invention will become apparent during the course of the following description.

In the drawings I have shown one embodiment of the invention. In this showing:

Figure 1 is a sectional view, partly in elevation, showing a pedal operable master cylinder and the valve operating and hydraulic reaction parts associated therewith, together with the valve operating lever means, other elements of the system being diagrammatically shown;

Figure 2 is a section on line 2—2 of Figure 1;

Figure 3 is an end elevation of the combined master cylinder and valve mechanism, parts being shown in section; and Figure 4 is a detail sectional view, partly in elevation, showing one of the auxiliary control valves which is subject to operation in accordance with vehicle deceleration.

Referring to Figure 1, the numeral 10 designates an elongated preferably die-cast body in which is formed a master cylinder bore 11. A conventional plunger 12 is movable in the master cylinder bore to generate pressure in the master cylinder chamber 13, the plunger 12 being conventionally operated by a pedal 14. Above the master cylinder is formed the usual reservoir 15 feeding fluid into the space back of the forward head 16 of the plunger 12 through a port 17. The head 16 is provided with the usual cup 18 and just in advance of this cup, when it is in normal position, a compensating port 19 communicates between the reservoir 15 and chamber 13. The parts of the mechanism thus far described are conventional.

A valve operating plunger 22 is slidable in the lefthand end of the bore 11 and is sealed therein as at 23. Movement of the plunger 22 to the right is limited by a ring 24, and a return spring 25 is arranged between this ring and the plunger cup 18. The plunger 22 is provided with an axial extension 26 engageable by the cup 18 to operate the plunger 22 in the event of a failure of pressure in the chamber 13.

To the left thereof in Figure 1, the plunger 22 is provided with an integral axially extending portion 30 annularly grooved as at 31 for a purpose to be described. Also integral with the plunger 22 and extending axially to the left of the plunger portion 30 is an extension 32 provided with a snap ring stop member 33 for a purpose to be described. This snap ring slidably surrounds the groove 34 formed around the axial extension 32 with normal substantial play being provided between the right-hand side of the snap ring 33 and the right-hand extremity of the groove 34. The body 10 is provided in the left-hand end thereof as viewed in Figure 1 with an axial bore 36, coaxial with the bore 11. Against the shoulder between these two bores is arranged a stop ring 37 for a purpose to be described.

A closed-ended sleeve 40 is arranged in the bore 36 and is fixed in position by a snap ring 41. In the sleeve 40 is arranged an annular plunger 42 sealed with respect to the sleeve 40 and extension 32 as at 43. The interior of the sleeve 40 adjacent the head thereof forms a hydraulic chamber 45 communicating through radial ports 46 with an annular groove 47 formed around the sleeve 40 and communicating with a port 48 for a purpose to be described. A stop ring 50 seats against the inner end of the sleeve 40 and against the adjacent end of the annular plunger 42. A compression spring 51 seats at opposite ends against the stop members 37 and 50, thus tending to maintain the stop member 50 against the sleeve 40.

To the left of the plunger 22 is formed a low pressure chamber 54 communicating with a port 55 leading to the reservoir 15. The chamber 54 thus is maintained full of brake fluid at atmospheric pressure. It will be apparent therefore that both ends of the seals 23 and 43 will be maintained in contact with brake fluid, thus being fully lubricated and retained in a wet freely slidable condition.

A valve housing 60 is fixed as at 61 to the top of the body 10 as shown in Figure 1. The valve housing is provided therein with a control chamber 62 communicating with the chamber 53 through a passage 63. A lever 64 projects through the passage 63 and has its upper end arranged in the chamber 62. The lower end of the lever 64 is arranged in the annular groove 31. The lever 64 is fulcrumed in the passage 63 by means of an O-ring 65 which also serves to seal the chambers 54 and 62 from each other. The chamber 62 communicates with one end of a fluid line 66 further described below.

Referring to Figure 2, a horizontally arranged lever 68 is arranged in the control chamber 62 and is fulcrumed on the reduced upper end of the lever 64 as shown in Figure 1. The valve housing 60 is provided with a vacuum chamber 69 communicating through a nipple 70 with a conduit 71 leading to a suitable source of vacuum such as the motor vehicle engine intake manifold. A port 72 extends between the chambers 62 and 69 and is provided in the latter chamber with a valve seat 73.

In the chamber 69 is arranged a resilient valve 75 engageable with but normally disengaged from the seat 73. The valve 75 is carried by a stem 76 coaxial with the port 72. One end of this stem slides in the bearing opening 77 in the housing 60 and the other end is slidable in a closure cap 78 tapped into the chamber 69. In the chamber 62, the stem 76 is provided with an annular groove 79 engaged by one end of the lever 68.

A plug 82 is threaded into the outer end of a bore 83 formed in the valve body 60, the inner end of this plug terminating in a valve seat 84. The plug 82 within the valve seat 84 is provided with a bore 85 communicating through ports 86 with an annular space 87 connected to the atmosphere through a nipple 88 (Figure 3), preferably provided with an air cleaner (not shown).

A valve 90, preferably having a resilient face, normally engages the valve seat 84 and is carried by a stem 91 one end of which slides in a bearing opening 92 in the valve housing 60. The other end of this stem projects through the chamber 85 and is slidable in an opening 93 in the plug 82. Within the control chamber 62, the stem 91 is grooved as at 94 for engagement with the adjacent end of the lever 68. A spring 95 biases the valve 90 to closed position.

The valve mechanism and the operating means therefor, described above, are substantially identical with the copending application of William Stelzer, Serial No. 626,736, now Patent No. 2,862,364. Such part of the mechanism, therefore, forms per se no part of the present invention.

A booster motor indicated as a whole by the numeral 100 is preferably employed in the present system and is disclosed and claimed in my copending application Serial No. 523,309, filed July 20, 1955, now abandoned. Such motor also therefore forms per se no part of the present invention. The motor comprises a cylinder 101 divided intermediate its ends by a partition 102, thus forming a pair of motor units. One of these motor units, associated with the front wheel cylinders of a passenger motor vehicle, as described below, is provided with a piston 103 connected by a rod 104 to a plunger 105 operable in a hydraulic cylinder 106 to displace fluid therefrom. Such fluid is displaced through lines 107 to the front wheel cylinders 108 to apply the associated brakes. A hydraulic line 109 is connected between the lines 107 and the port 48 so that hydraulic pressure to which the front wheel cylinders are subjected will be duplicated in the chamber 45 to provide pedal reaction as further referred to below. A hydraulic line 110 is tapped at one end into the master cylinder chamber 13 and has its other end connected to the cylinder 106 back of the plunger 105.

The motor for the rear wheels is provided therein with a piston 114 connected by a rod 115 to a plunger 116 operable in a hydraulic cylinder 117. This cylinder is connected by suitable lines 118 to the rear wheel brake cylinders 119. The rod 115 is reduced back of the plunger 116 as at 120 to provide a space communicating through a port 121 with a reservoir 122. This reservoir compensates for any leakage from the cylinder 117 or the brake cylinders or hydraulic lines connected thereto.

A vacuum line 125 is connected to a source of vacuum such as the intake manifold of the motor vehicle. This vacuum line is connected as at 127 and 128 to the remote chambers 129 and 130 of the motor unit, such chambers therefore being constant pressure chambers. The front and rear motor units are provided between the partition 102 and the respective pistons 103 and 114 with variable pressure chambers 131 and 132, and the pressures in these chambers are controlled through fluid lines 133 and 134 in a manner described below.

The fluid line 66 (Figure 1) is provided with a pair of branches 136 and 137 leading respectively to solenoid operated valve mechanisms 138 and 139. These valve mechanisms are identical and one of them, for example the mechanism 138, has been illustrated in Figure 4. Referring to such figure, the numeral 142 designates a preferably die-cast body having upper and lower chambers 143 and 144 formed therein communicating respectively, in the case of the valve mechanism 138, with the lines 136 and 133. The corresponding chambers of the valve mechanism 139 communicate respectively with the lines 137 and 134. The chambers 143 and 144 normally communicate through a port 145. This port has a seat 146 at its lower end engageable by a normally open valve 147, biased to open position by a spring 148. The upper end of the stem 149 of the valve 147 forms the armature of a solenoid 150.

The solenoid 150 of the valve mechanism 138 has one side grounded as at 154. The other terminal of the solenoid is connected by a wire 155 to a contact 156 of an inertia switch device 157, preferably a tube having a body of mercury 158 therein. The other contact 159 of the mercury switch is connected by a wire 160 to the vehicle battery 161. The body of the mercury switch is pivoted as at 162 and the free end of the switch is urged upwardly by a spring 163, such movement being limited by an adjusting screw 164.

One terminal of the solenoid 150 of the valve mechanism 139 is grounded as at 168 and the other terminal of such solenoid is connected by a wire 169 to one contact 170 of a mercury switch 171 identical in construction, but not in position, with the switch 157. The other terminal 172 of the mercury switch 171 is connected by a wire 173 to the battery 161, the latter having its second terminal grounded as at 174.

Operation

While not limited to such use as will be apparent, the present system is particularly intended for use on passenger vehicles on which greater braking effort may be effected at the front wheels than at the rear wheels, due to the very substantial weight of the vehicle engine supported at the front end of the vehicle. Bearing this in mind, it will be noted that the angle of inclination of the switch 157 from the horizontal is appreciably greater than the corresponding angle of the switch 171. As will become apparent, the bodies of mercury of the two switches remain in the lower ends of the tubes when the vehicle is at rest and under most operating conditions.

The parts normally occupy the positions shown in Figure 1. When the brakes are to be applied, the operator will depress the pedal 14 to move the plunger 12 to the left in Figure 1, closing the compensating port 19 and thereupon starting to build up pressure in the chamber 13. Fluid will be displaced from this chamber through line 110 into the cylinder 106 back of the plunger 105. This plunger is of such conventional type as to provide for the passage of fluid to the left in Figure 1 through or around the plunger to be displaced through lines 107 into the brake cylinders 108 to start to take up the play in the brake shoes. Devices of this kind are now in common use and are of two types, one of which provides for the seepage of hydraulic fluid around a lipped seal. The other type provides for the flow of fluid through the plunger, as shown, for example, in the patent to J. G. Ingres, 2,805,647, granted September 10, 1957.

The valve parts normally occupy the positions shown in Figure 2, the vacuum valve 75 being open and the air valve 90 closed. The control chamber 62 thus will be connected to the chamber 69 and vacuum will be supplied through lines 136 and 137, through the respective valve mechanisms 138 and 139 (the valves 147 being normally open) to the variable pressure motor chambers 131 and 132. Accordingly, pressures in all of the motor chambers will be balanced. However, when pressure is developed in the master cylinder chamber 13 as described above, the plunger 22 (Figure 1) will be displaced to the left to correspondingly move the lower end of the lever 64. The upper end of this lever will move the lever 68 (Figures 1 and 2) intermediate its ends toward the right. Such movement of the end of the lever associated with the air valve 90 will be opposed by the spring 95, hence the other end of the lever 68 will promptly close the vacuum valve 75. Thus vacuum will be cut off from the motor chambers 131 and 132.

Since the closing of the valve 75 limits movement of the stem 76 and the adjacent end of the lever 68, the other end of the lever 68 will move against the relatively light spring 95 to open the valve 90 and admit air into the chamber 62. This air will flow through lines 66, 136 and 137, through the valve mechanisms 138 and 139, and thence through the pipes 133 and 134 into the respective motor chambers 131 and 132. Thereupon, the pistons 103 and 114 will move away from each other to operate their plungers 105 and 116. Accordingly, fluid will be displaced from the chamber 106 into the front wheel cylinders, while fluid will be displaced from the chamber 117 into the rear wheel cylinders. Thus the branes will be applied and the degree to which pressure is built up in the motor chambers 131 and 132 will depend, of course, upon the displacement of the lever 68 (Figure 2) to the right of its normal position. This displacement will be dependent upon the distance of movement of the plunger 22 which, in turn, is dependent upon the pressure developed in the chamber 13.

It will be apparent, therefore, that the motor units will be energized to a degree proportionate to operation of the brake pedal 14 to generate pressure in the chamber 13. The latter pressure, acting behind the piston 105 (Figure 1) will assist the piston 103 in developing pressures in the chamber 106 and consequently pressures in the front wheel cylinders 108. Pressures developed in the rear wheel cylinders will be dependent solely upon the pressure admitted to the chamber 132, and hence a greater braking effort will be exerted at the front wheels than the rear wheels, which is highly desirable in a passenger vehicle. This fact alone tends to prevent the rear wheels from locking and sliding which results in a loss in traction and braking effort and limits the maximum possible rate of vehicle deceleration.

Assuming that the operator is making an emergency stop, it is wholly possible for him to operate the valve mechanism for the motor units to develop in the chamber 132 a pressure sufficient to lock the rear wheels of the vehicle. When the rate of vehicle deceleration increases to a predetermined point, however, the body of mercury in the switch 171, because of its inertia, will move forwardly in its tube to close a circuit across the contacts 170 and 172. Under such conditions, the solenoid 150 for the switch mechanism 139 will be energized to close the valve 147 of such switch mechanism 139. This results in disconnecting the line 137 from the line 134 to prevent the building up of additional pressure in the motor chamber 132. Energization of the rear wheel motor unit, therefore, will be limited to a point below the point at which the rear wheels will be locked, and the traction of such wheels will be retained to provide for a greater braking effect. This portion of the mechanism also is disclosed in my copending application 523,309, now abandoned, referred to above.

It has been found that a system such as disclosed in the copending application just referred to is so efficient in operation as to materially increase the maximum possible rate of vehicle deceleration, which is an important factor of safety in the operation of a motor vehicle. It has been found possible with such a system, however, in the event of a "panic" stop, to cause all wheels to lock and accordingly lose traction and the desired substantial braking effect. This is due to the fact that, while the front wheels tend more effectively to maintain traction due to the weight of the vehicle engine, the brakes are being applied by the combined forces of the piston 103 and the pressure developed in the chamber 13. Since the latter pressure can be increased very rapidly and to a relatively high point during a so-called "panic" stop, it is wholly possible to lock the front wheels of the vehicle, which obviously is disadvantageous.

The present system therefore contemplates the use of the two mercury switches in combination with the dual motor arrangement through which the brakes are applied, and it will be noted that the inclination of the mercury switch 157 from the horizontal is greater than the corresponding inclination of the switch 171. When the rate of vehicle deceleration increases to a predetermined point, therefore, the switch 171 will function to prevent the addition of further air to the motor chamber 132 and since this greatly increases the efficiency of the brake operation, the rate of vehicle deceleration will continue to increase instead of dropping off, as would be the case if the switch 171 were not used in the system. It is largely because of this greatly increased rate of possible deceleration by using the switch 171 that the front wheels of the vehicle can be caused to lock. When the rate of vehicle deceleration increases to a point above that at which the switch 171 becomes operative, the body of mercury 158 in the switch 157 will be caused to be moved forwardly by its inertia to close a circuit across the contacts 156 and 159. Thereupon, the solenoid 150 for the valve mechanism 138 will be energized to close communication therethrough between the pipes 136 and 133 and hence no additional pressure can be built up in the chamber 131. Any increased braking effect at the front wheels therefore must be dependent solely upon the operator's ability to generate pressure in the master cylinder chamber 13. The use of the switch 157, therefore, affects only the pressure applied to the motor piston 103 and has no effect on the provision of additional pressure by the operator by exerting great force on the pedal 14 to increase the pressure behind the piston 105. This pressure, however, cannot increase to the point where the front wheels can be locked on ordinary dry road surfaces. Therefore it will be apparent that the front wheels also will be prevented from locking and losing traction, and the present system through the cooperation of its parts, therefore, provides for a higher degree of vehicle deceleration than has ever been attained before, even with the system disclosed in my copending application Serial No. 523,309, now abandoned, referred to above.

As previously stated, the pipe line 109 connects the lines 107 to the chamber 45 (Figure 1). Therefore as pressures are built up in the front wheel cylinders, identical pressures will be built up in the chamber 45 and such pressure opposes movement to the left of the axial projection 32 and hence of the plunger 22. A direct hydraulic reaction accordingly will be transmitted to the plunger 12 to be transmitted to the brake pedal 14. Due to the relatively limited area of the axial projection 32, the hydraulic reaction will be relatively limited during initial brake operation. As higher pressures are developed in the front wheel cylinders, a point will be reached at which the pressure in the chamber 45 is sufficient to overcome the loading of the spring 51. Thereupon, the annular plunger 42 will move to the right of its position shown in Figure 1. It will be understood that this operation takes place with the axial projection 32 moved to the left of the position shown in Figure 1 to operate the valve mechanism, and the right-hand side of the groove 34 will be in relatively close proximity to the snap ring 33. When the plunger 42 moves to the right of its normal position, therefore, it will correspondingly move the stop ring 50 and snap ring 33 and the latter will engage against the right-hand side of the groove 34. The plunger 42 thus transmits additional hydraulic reaction to the plunger 22. In the upper ranges of brake application, therefore, high hydraulic reactions will be transmitted to the plunger 22.

It will be apparent therefore that initial movement of the brake pedal takes place against negligible resistance, and then against the reaction transmitted solely by the limited area of the axial extension 32, followed by an increased hydraulic reaction incident to operation of the annular plunger 42. Brake pedal resistance thus progressively increases from initial movement of the brake pedal through the range of brake operation.

It will be apparent that after vehicle deceleration has taken place to a predetermined extent, assuming that both switches 157 and 171 have become operative, the body of mercury 158 of the switch 157 will move out of engagement with the contacts 156 and 159, thus placing pressures in the motor chamber 131 under the control of the follow-up valve mechanism. The rate of vehicle deceleration having decreased to a predetermined point, the front wheels can tolerate additional braking without sliding. When the rate of vehicle deceleration further decreases to a predetermined extent, the same operation takes place relative to the mercury switch 171, the body of mercury going away from the contacts 170 and 172, thus restoring communication between the motor chamber 132 and the follow-up valve mechanism, the rear wheels now being susceptible to greater motor pressures without locking.

It also will be apparent that if the brake pedal is released without bringing the vehicle to a stop after having made an emergency application of the brake pedal, the weight of the mercury in both switches will open the contacts of such switches and re-establish normal conditions in the system so that any subsequent braking will take place solely as controlled by operation of the brake pedal and the follow-up valve mechanism.

When the brake pedal is released, the parts will return to their normal positions. Upon the releasing of the brake pedal, the spring 25 will return the plunger 12 to normal position, thus dropping the pressure in the chamber 13 and in the chamber 106 back of the plunger 105. Pressures already present in the chamber 45 will return the plunger 22 to its normal position against the stop 24. The spring 95 (Figure 2) will return the valves 75 and 90 to their normal positions, disconnecting the chamber 62 from the atmosphere and connecting it to the vacuum chamber 69. Both motor units therefore will again be vacuum-suspended.

From the foregoing, it will be apparent that the present system provides a highly efficient end result in the application of vehicle brakes where a high rate of vehicle deceleration is necessary. At any given relatively high vehicle speed, the vehicle can be brought to a complete stop in a much shorter distance than is possible without either of the mercury switches. The vehicle can be brought to a complete stop more rapidly with the use of both mercury switches than with only one, for the reasons given above. The mercury switch 171 functions when the vehicle deceleration increases to a predetermined point to limit the application of pressure to the rear wheel cylinders 119 prior to the point at which such wheels will be locked. The front wheel cylinders can tolerate substantially higher pressures without locking the front wheels, and the present system provides for such proportionately greater braking at the front wheels than at the rear wheels. Since the use of the mercury switch 171 alone greatly increases the possible rate of vehicle deceleration over what can be accomplished with conventional systems, it is possible without the mercury switch 157 to lock the front vehicle wheels. The mercury switch 157, however, comes into operation at a rate of vehicle deceleration greater than that at which the switch 171 becomes operative, and thus prevents the locking of the front vehicle wheels. Traction on all of the vehicle wheels accordingly is maintained and the wheels can be subjected to the maximum possible effective braking to materially reduce the distance of travel of any given vehicle necessary to bring it to a stop.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. A booster brake system for a motor vehicle having front and rear sets of wheel cylinders, comprising a pair of fluid pressure motor units each having a pressure responsive unit and a variable pressure chamber at one side thereof, a plunger connected to each pressure responsive unit, a hydraulic cylinder in which each plunger is movable to displace fluid therefrom, one of said cylinders being connected to one set of wheel cylinders and the other cylinder being connected to another set of wheel cylinders, a control valve mechanism normally connecting both variable pressure chambers to a source of relatively low pressure and operable for connecting said variable pressure chamber to a source of higher pressure to operate said pressure responsive units, means subject to operation upon a predetermined degree of vehicle deceleration for limiting the maximum pressure in one of said variable pressure chambers, and means responsive to a higher degree of vehicle deceleration for limiting maximum pressures in the other of said variable pressure chambers.

2. A booster brake system for a motor vehicle having front and rear sets of wheel cylinders, comprising a pair of fluid pressure motor units each having a pressure responsive unit and a variable pressure chamber at one side thereof, a plunger connected to each pressure responsive unit, a hydraulic cylinder in which each plunger is movable to displace fluid therefrom, one of said cylinders being connected to one set of wheel cylinders and the other cylinder being connected to another set of wheel cylinders, a control valve mechanism having a control chamber, separate fluid lines connecting said control chamber to said variable pressure chambers, said valve mechanism comprising valve elements connected between said control chamber and sources of relatively low and high pressures and normally connecting said control chamber to said source of low pressure, means for operating said valve mechanism to disconnect said control chamber from said source of low pressure and connect it to said source of high pressure to operate both pressure responsive units, and an inertia controlled valve device in each of said separate fluid lines, one of said valve devices comprising inertia operated means responsive to a predetermined rate of vehicle deceleration for closing the associated separate fluid line, the other valve device comprising an inertia operated means for closing the other separate fluid line at a higher rate of vehicle deceleration, the closing of each valve device limiting the maximum pressure in the associated variable pressure chamber.

3. A system according to claim 2 wherein each of said valve devices comprises a normally open valve in each fluid line having a solenoid connected thereto and energizable for closing it, each of said inertia controlled devices comprising a mercury switch having a casing, with a body of mercury therein, inclined upwardly and forwardly of the vehicle and provided in the upper portion thereof with contacts connected in the circuit of the associated solenoid, one of said casings being inclined to the horizontal to a greater degree than the other of said casings.

4. A booster brake system for a motor vehicle having front and rear sets of wheel cylinders, comprising a first fluid pressure motor unit and a second fluid pressure motor unit, each such unit having a pressure responsive unit and a variable pressure chamber at one side thereof, and a plunger connected to each pressure responsive unit, a first hydraulic cylinder in which the plunger of said first motor unit is movable to displace fluid therefrom, a second hydraulic cylinder in which the plunger of said second motor unit is movable to displace fluid therefrom, said first cylinder being connected to one set of wheel cylinders and said second cylinder being connected to the other set of wheel cylinders, a control valve mechanism normally connecting the variable pressure chambers of both motor units to a source of relatively low pressure and operable for connecting said variable pressure chambers to a source of higher pressure to operate said pressure responsive units, means responsive to a predetermined degree of vehicle deceleration for limiting the maximum pressure in the variable pressure chamber of said first motor unit, means responsive to a higher degree of vehicle deceleration for limiting maximum pressures in the variable pressure chamber of said second motor unit, a master cylinder, an operating plunger movable thereinto to generate pressure therein, a control plunger in said master cylinder movable by pressure therein and connected to said valve mechanism to operate it, and a fluid line connected between said master cylinder and said second cylinder back of the plunger therein whereby pressures in said master cylinder assist the pressure responsive unit of said second motor in moving its associated plunger.

5. A booster brake system for a motor vehicle having front and rear sets of wheel cylinders, comprising a first fluid pressure motor unit and a second fluid pressure motor unit, each such unit having a pressure responsive unit and a variable pressure chamber at one side thereof, and a plunger connected to each pressure responsive unit, a first hydraulic cylinder in which the plunger of said first motor unit is movable to displace fluid therefrom, a second hydraulic cylinder in which the plunger of said second motor unit is movable to displace fluid therefrom, said first cylinder being connected to one set of wheel cylinders and said second cylinder being connected to the other set of wheel cylinders, a control valve mechanism having a control chamber, valve means normally connecting said control chamber to a source of relatively low pressure and operable for connecting it to a source of relatively high pressure, separate fluid lines connecting said control chamber to said variable pressure chambers, an inertia responsive valve device in each of said separate fluid lines, one of said inertia responsive valve devices having means rendering it operative upon a predetermined degree of vehicle deceleration for closing the associated fluid line, the other inertia responsive valve device having means rendering it operative upon a higher rate of vehicle deceleration for closing the other of said separate fluid lines, a master cylinder having a pressure generating plunger movable therein, a control plunger in said master cylinder movable by pressure therein and connected to said valve mechanism to operate it, and a hydraulic line connected between said master cylinder and one of said hydraulic cylinders back of the plunger therein.

6. A system according to claim 5 wherein each of said inertia responsive devices comprises a normally open valve in its associated separate fluid line, a solenoid energizable for closing such valve, and an inertia controlled switch in the circuit of each solenoid, each switch comprising an elongated casing inclined upwardly and forwardly of the vehicle and having contacts in the upper end thereof in the associated circuit, and a body of mercury in such casing, the casing of said other inertia responsive device being inclined from the hoizontal at a greater angle than the casing of the switch of said one inertia responsive device.

7. A booster brake system for a motor vehicle having front and rear sets of wheel cylinders, comprising a first fluid pressure motor unit and a second fluid pressure motor unit, each such unit having a pressure responsive unit and a variable pressure chamber at one side thereof, and a plunger connected to each pressure responsive unit, a first hydraulic cylinder in which the plunger of said first motor unit is movable to displace fluid therefrom, a second hydraulic cylinder in which the plunger of said second unit is movable to displace fluid therefrom, said first cylinder being connected to one set of wheel cylinders and said second cylinder being connected to the other set of wheel cylinders, a control valve mechanism comprising a control chamber and valve means normally connecting such chamber to a source of relatively low pressure and operative for connecting it to a source of relatively high pressure, a first fluid line connecting said control chamber to the variable pressure chamber of said first motor, a second fluid line connecting said control chamber to the variable pressure chamber of said second motor, an inertia controlled valve device associated with each of said first and second fluid lines, each valve device comprising a normally open valve in the associated fluid line, a solenoid energizable for closing such valve, a normally open inertia controlled switch in the circuit of each solenoid, the inertia controlled switch of the valve device for said first fluid line having means rendering it responsive to a predetermined degree of vehicle deceleration for energizing the associated solenoid, the other inertia controlled switch having means rendering it responsive to a higher rate of vehicle deceleration for energizing its associated solenoid, a master cylinder having a fluid displacing plunger movable therein, a control plunger in said master cylinder connected to said valve mechanism to operate it, and a fluid line connected between said master cylinder and said second hydraulic cylinder back of the plunger therein.

8. A booster brake system for a motor vehicle having front and rear sets of wheel cylinders, comprising a pair of hydraulic cylinders each connected to one set of wheel cylinders, a plunger operable in each hydraulic cylinder to displace fluid therefrom, power means connected to said plungers to operate them, a control mechanism connected between said power means and a source of power and operable for energizing said power means, first means responsive to operation upon a predetermined degree of vehicle deceleration for limiting the capability of said power means for generating pressure for one set of wheel cylinders, and second means responsive to a higher degree of vehicle deceleration for limiting the capability of said power means for generating pressure for the other set of wheel cylinders.

9. A system according to claim 8 wherein each of said first and second means comprises a device having an element movable in response to vehicle deceleration for rendering such device operative.

10. A booster brake system for a motor vehicle having front and rear sets of wheel cylinders, a pair of hydraulic cylinders each connected to one set of wheel cylinders, a plunger movable in each hydraulic cylinder to displace fluid therefrom, a motor connected to each plunger to operate it, common control means connected between said motors and a source of power and operative for simultaneously energizing said motors, first means responsive to a predetermined degree of vehicle deceleration for limiting the capability of one of said motors for generating pressure in the associated hydraulic cylinder, and second means responsive to a higher degree of vehicle deceleration for limiting the capability of the other motor for generating pressure in its associated hydraulic cylinder.

11. A mechanism according to claim 10 wherein said common control means has separate power supplying means connected to each motor, said first and second means comprising an auxiliary control device connected in each power supplying means, and an inertia responsive control device connected to each auxiliary control device.

12. A system according to claim 10 provided with separate power supplying connections between said control mechanism and said motors, said first and second means comprising an electrically operated auxiliary control device in each of said connections, and an inertia operated switch connected in circuit with each auxiliary control device, the inertia operated switch for said first means comprising a device for rendering it operative upon a predetermined rate of vehicle deceleration, the inertia operated switch for said second means comprising a device responsive to a higher degree of vehicle deceleration.

References Cited in the file of this patent

UNITED STATES PATENTS

| | | |
|---|---|---|
| 2,073,163 | Martin | Mar. 9, 1937 |
| 2,079,409 | Hunt | May 4, 1937 |
| 2,181,161 | Wolf | Nov. 28, 1939 |
| 2,182,463 | Beeston | Dec. 5, 1939 |
| 2,353,755 | Price | July 18, 1944 |
| 2,402,344 | Price | June 18, 1946 |
| 2,726,739 | Jeanson | Dec. 13, 1955 |
| 2,747,697 | Banker | May 29, 1956 |
| 2,845,147 | Hill | July 29, 1958 |

FOREIGN PATENTS

| | | |
|---|---|---|
| 799,263 | France | Mar. 27, 1936 |